Feb. 18, 1964 R. G. McGRATH 3,121,789
MEANS FOR SELECTIVELY MONITORING RADIOACTIVITY
IN CONDUITS IN CLOSE ARRAY
Filed Jan. 23, 1959

WITNESSES:
Bernard R. Giegner
James F. Young

INVENTOR
Robert G. Mc Grath
BY
Donald Smith
ATTORNEY

United States Patent Office 3,121,789
Patented Feb. 18, 1964

3,121,789
MEANS FOR SELECTIVELY MONITORING RADIO-ACTIVITY IN CONDUITS IN CLOSE ARRAY
Robert G. McGrath, Penn Hills, Pa., assignor to Westinghouse Electric Corporation, East Pittsburgh, Pa., a corporation of Pennsylvania
Filed Jan. 23, 1959, Ser. No. 788,620
10 Claims. (Cl. 250—43.5)

The present invention relates to a method and means for continuously monitoring a plurality of fluid conduits for radioactivity and more particularly to a method and means for detecting leakage of radioactive material into one or more of these conduits.

There are many applications wherein it is desired to detect the presence of radioactivity in fluid streams conducted from a plurality of sources. For example, in a hot cell or laboratory, i.e. a laboratory handling radioactive material, or in other buildings housing personnel and disposed at or near plants handling radioactive material, it is desirable to test frequently samples of air derived from various points or areas within the laboratory or buildings. In certain chemical processes involving extraction or addition of radioactive materials, it is desired to sample the washing solutions employed at frequent steps in the process for radioactive content. This is necessary for example to ascertain the progress of various decontamination procedures, or to ascertain the presence of leaks from certain items of equipment. Another application wherein it is desirable to monitor simultaneously a plurality of streams for radioactivity is involved in the storage of highly radioactive material. Such material frequently is stored in containers provided with a water jacket or other cooling means for removing the heat of radioactive decay. The presence of radioactivity in the water, other than the usual low level of induced radioactivity, indicates leakage or escape of radioactive material from the storage container.

Previously arrangements for detecting the presence of radioactivity in a plurality of streams or conduits included the use of a radiation detector associated with each of the streams. Where the streams were relatively closely spaced, considerable shielding was required in order to prevent a given detector from indicating radioactivity of an adjacent conduit rather than the particular conduit with which the detector was associated. Moreover, if the detectors of the prior arrangement are operated continually, separate amplifying and monitoring circuitry is required for each detector. Accordingly, this form of arrangement involved considerable expense, and, moreover, necessitated reading of a plurality of meters or other indicating means by operating personnel.

It is an object of the invention accordingly to provide a novel and efficient arrangement for continuously monitoring a relatively large number of fluid streams or conduits for the presence of radioactivity.

Another object of the invention is to provide the detector with means for ascertaining which, if any, of a plurality of fluid streams contains radioactivity.

A further object of the invention is the provision of a radioactivity monitor for use with a plurality of possible sources of radioactivity.

Another object of the invention is to provide a radioactivity monitor with means for utilizing a single radiation detector, and amplifying and metering circuit therefor, for monitoring a plurality of possible sources of radioactivity.

In the forthcoming description, these and other objects, features and advantages of the invention will be elaborated upon in conjunction with the accompanying drawings wherein.

Figure 1:
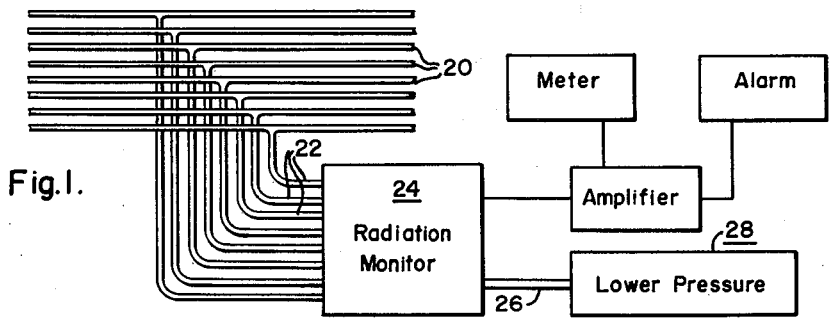
FIGURE 1 is a schematic view of one application of the invention.

Referring now to FIG. 1 of the drawings, the radiation monitor of the invention is adapted for use with a plurality of fluid streams or conduits, denoted generally by the reference character 20. The conduits 20 are each coupled to an area or item of equipment (not shown) from which radioactive material possibly could leak into the fluid streams or conduits 20. A relatively small connecting tube 22 is coupled to each of the conduits 20 and pass through a radiation monitor, denoted generally by the reference character 24. If the fluid contained within the conduits 20 is the same or can be combined for other reasons, this fluid is conducted through an outlet conduit 26 to an area of lower pressure, denoted generally by the reference character 28, which may be the intake of a suitable pump (not shown). As will be apparent from the description of FIGS. 2 and 3, connection of the radiation monitor 24 to the lower pressure area 28 serves to impel the fluid in each of the connecting conduits 22 through the radiation monitor 24.

Figure 2:
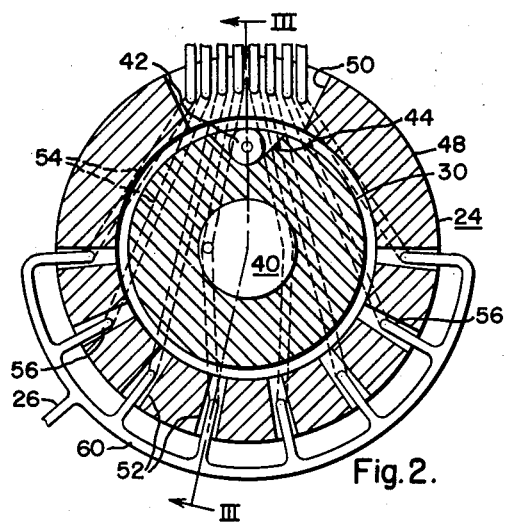
FIG. 2 is a cross-sectional view showing one form of radiation monitor according to the invention and taken along reference lines II—II of FIG. 3 of the drawings.
Figure 3:
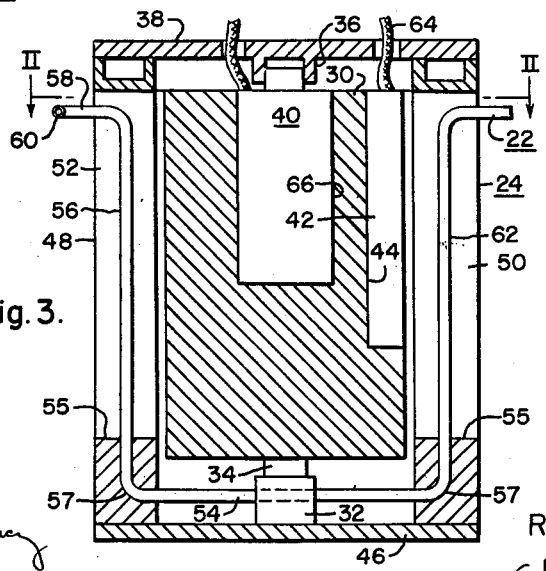
FIG. 3 is a longitudinal sectional view of the radiation monitor illustrated in FIG. 2 and taken along reference lines III—III thereof.

The radiation monitor is shown in detail in FIGS. 2 and 3 of the drawings. In this arrangement, the monitor 24 comprises a cylindrical rotor 30 mounted upon a radial and thrust bearing arrangement, denoted generally by the reference character 32. The rotor 30 is secured to a vertical shaft 34 which is seated upon the bearing member 32 and the upper end thereof, as viewed in FIG. 3 of the drawings, is stabilized by a sleeve bearing 36 secured to the undersurface of cover 38. The rotor 30 is rotated as desired by a synchromechanism or stepping switch of conventional design and denoted generally by the reference character 40. Movement of the rotor 30 for purposes described hereinafter can thus be controlled by operating personnel from a remote, shielded location. A radiation detector tube 42 of conventional design is inserted into a vertical groove 44 furnished on the outer periphery of the rotor 30. The particular form of radiation tube may vary with the type of radioactivity associated with the conduits 20. Since most types of radioactivity produce charged particles, a Geiger-Mueller counter or the like can be employed.

A bearing member 32 which supports the rotor is, in turn, supported by a bottom plate member 46. A generally cylindrical shield 48 is supported on the plate 46, and the rotor 30 is relatively closely fitted within the shield 48. The shield 48 is fabricated from lead or other suitable radiation-shielding material and is provided with a relatively broad vertical slot 50 and a plurality of relatively thin vertical slots 52. The first-mentioned slot 50 is of sufficient width to permit insertion between the vertical walls thereof of all of the connecting conduits 22 when the latter are arranged in a closely spaced array. In the normal monitoring position of the rotor 30, as shown in FIGS. 2 and 3, the inlet conduits 22 pass downwardly through the wide slot 50 in close proximity to the radiation detector tube 42. At the bottom of the slot 50, the connector tubes 22 fan outwardly toward the narrow vertical slots 52, respectively, as denoted by the reference character 54. The connecting tubes 22 are supported within the radiation monitor 24, for example, by being embedded in the lower wall portions of the container 48, i.e. in that portion of the container beneath the lower ends 55 of the slots 50. In this arrangement then, each connecting tube 22 is formed with a generally U-shaped configuration within the radiation monitor 24. Thus, the lower bends 57 of the connecting tubes 22 in this arrangement are embedded in the walls of the container 48. At the respective slots 52, the connecting conduits 22 are bent upwardly to pass through the slots 52 at a position adjacent the outer periphery of the cylindrical shield 48, as denoted by the reference characters 56. The connecting conduits 22 exit from the radiation monitor adjacent the upper ends of its slots 52 and are provided with radial outward extensions 58 whereby the tubes 22 are coupled to an outlet manifold 60. The outlet manifold, in turn, is coupled to the conduit 26 described previously in connection with FIG. 1 for conveyance of the combined, monitored fluids to the lower pressure area 28.

It will be appreciated that the openings or slots 50 and 52 need not be as long as those shown in FIGS. 2 and 3 of the drawings. For example, where less sensitivity is required, the slots 50 and 52 can be made relatively short in the vertical direction, and by the same token, the radiation detector 42 need not be as relatively long as that shown in FIG. 3 of the drawings. On the other hand, the sensitivity of the radiation monitor can be increased by employing a longer radiation detector 42 and correspondingly longer slots 50 and 52 so that greater portions 62 and 56 of each conduit 22 are exposed to the radiation detector 42.

In the operation of the radiation monitor, the rotor 30 is maintained in the position shown in FIGS. 2 and 3 such that its detector tube 42 is exposed to all of the vertical sections 62 of the inlet or connecting conduits 22. In furtherance of this purpose, the groove 44 is generally V-shaped so that the detector 42 is exposed to radioactivity which may appear in any of the conduit sections 62. The rotor 30 is permitted to remain in this position until a signal which is higher than the normal background radiation appears in the external circuitry coupled to the detector tube 42 by means of the electric cable 64.

Figure 4:
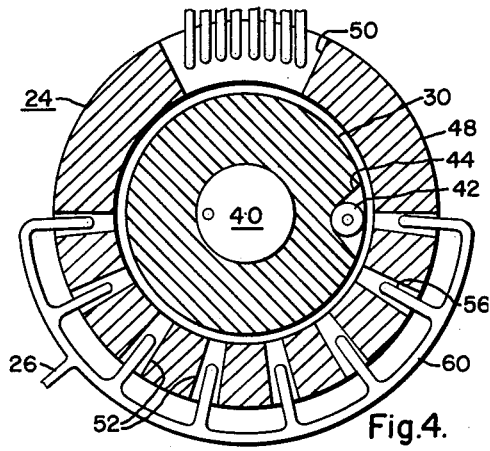
FIG. 4 is another cross-sectional view of the radiation monitor similar to FIG. 2 but showing a different operational position thereof.

When such a signal is heard, indicating that radioactive material has leaked into at least one of the conduits 20 and its associated connecting conduit 22, the rotor 30 is moved past each of the slots 52, either by manual operation or, desirably, by the remote synchro arrangement mentioned previously. The position of the rotor adjacent one of the slots 52 is illustrated in FIG. 4 of the drawings. The rotor 30 also is fabricated from a shielding material, such as that mentioned previously, which surrounds the cavity 66 in which the aforementioned synchro-mechanism 40 is mounted and the groove 44 in which is inserted the detector tube 42. Accordingly, when the rotor 30 is rotated such that the detector tube 42 is juxtaposed to one of the slots 52, the detector 42 is shielded by the body of the rotor 30 from the radioactivity contained in one or more of the inlet conduit portions 62. It also should be pointed out that the narrowness of the slots 52 prevents radiation from any one of the conduit portions 56 disposed respectively therein from reaching the detector 42 when it is juxtaposed to another of the conduit portions 56.

With this arrangement, one detector can be utilized for monitoring a plurality of fluid streams or conduits with an attendant simplification of the external circuitry and ease of taking the necessary readings. Moreover, the radiation monitor need not be manipulated until radioactivity appears in one of the conduits 20. Therefore, constant operator attention is not required for reading a series of meters associated respectively with a plurality of radiation detectors which otherwise would be required for monitoring each of the conduits 20. Moreover, the radiation monitor can be operated remotely, and, due to its relatively small size and comparatively little electronic equipment required therefor, can be installed and operated in those locations where space is at a premium.

Numerous modifications of the radiation monitor disclosed herein will occur to those skilled in the art without departing from the spirit and scope of the invention. Moreover, it is to be understood that the accompanying descriptive materials are intended for exemplifying the invention and should not be interpreted as limitative thereof.

Accordingly, what is claimed as new is:

1. A radiation monitor comprising a shielding container having a plurality of spaced first openings formed in a wall portion of said container and having a second opening formed in a wall portion of said container and removed from said first-mentioned openings, a plurality of fluid conduits extending through said second opening in a relatively closely spaced array, said conduits being separated after passing through said second opening and being passed respectively through said first openings, a radiation detector tube, means for juxtaposing said tube to said second opening and to said first openings successively, and means for shielding said tube from said second opening when said tube is juxtaposed to one of said first-mentioned openings.

2. A radiation monitor comprising a container having a plurality of spaced first openings formed in a wall of said container and having a second opening formed in said container and removed from said first openings, means for shielding each of said first openings from adjacent ones of said first openings, a radiation detector, means for successively juxtaposing said detector to each of said openings, and means for shielding said detector from said second opening when said detector is juxtaposed to one of said first openings, and means for conducting a plurality of potential radiation containing materials collectively through said second opening and respectively through said first openings.

3. A radiation monitoring arrangement for use with a radiation detector in detecting radioactivity in a plurality of conduits, said arrangement comprising means for mounting a first portion of each of said conduits in a relatively close array and for mounting a second portion of each of said conduits at positions spaced from one another and from said array, means for shielding each of said second conduit portions from one another, means for successively juxtaposing said detector to said first conduit portions and to each of said second conduit portions, and means for shielding said detector from said first conduit portions when said detector is juxtaposed to one of said second conduit portions.

4. A radiation monitoring arrangement for use with a radiation detector, said arrangement comprising a plurality of fluid conduits, means for mounting a first portion of each of said conduits in a relatively close array, means for mounting a second portion of each of said conduits in a spaced array, means for shielding each of said second conduit portions from others of said second conduit portions, means for successively juxtaposing said detector to said first conduit portions and to each of said second conduit portions, and means for shielding said detector from said first conduit portions when said detector is juxtaposed to any one of said second conduit portions.

5. A radiation monitor comprising a plurality of fluid conduits, a radiation detecting device, means for mounting a first portion of each of said conduits in a relatively close array, means for mounting a second portion of each of said conduits in a spaced array, means for shielding each of said second conduit portions from others of said second conduit portions, means for successively juxtaposing said detecting device to said first conduit portions and to each one of said second conduit portions, and means for shielding said detecting device from said first conduit portions when said detecting device is juxtaposed to any one of said second conduit portions.

6. In a radiation monitor, the combination comprising a tubular container fabricated from a radiation shielding material, a series of spaced first openings formed in a wall portion of said container, said openings being elongated in a longitudinal direction of said container and being shielded from one another by the intervening wall portions of said container, a second opening formed in a wall portion of said container and extending generally parallel to said first openings, said second opening being removed from said first openings, a rotor mounted for rotation within said tubular container, an elongated radiation detector mounted upon the outer periphery of said rotor, at least that portion of said rotor adjacent said detector being formed from a shielding material, means for rotating said rotor to juxtapose successively said radiation detector to said second opening and to each of said first openings, said detector being shielded from said second opening when juxtaposed to any one of said first openings by said rotor shielding material.

7. In a radiation monitor, the combination comprising a tubular container fabricated from a shielding material, a series of spaced first openings formed in a wall portion of said container, said openings being elongated in a longitudinal direction of said container and being shielded from one another by the intervening wall portions of said container, an elongated second opening formed in a wall portion of said container and extending generally parallel to said first openings, said second opening being spaced from said first openings, a rotor mounted for rotation within said tubular container, an elongated radiation detector mounted upon the outer periphery of said rotor and extending generally parallel to said openings, at least that portion of said rotor adjacent said detector being formed from a shielding material, means for rotating said rotor to juxtapose successively said radiation detector to said second openings and to each of said first openings, said detector being shielded from said second opening when juxtaposed to any one of said first openings by said rotor shielding material, a plurality of fluid conduits, means for mounting a first portion of each of said conduits in a relatively close array in said second opening and for mounting a second portion of each of said conduits respectively in each of said first openings.

8. In a radiation monitor, the combination comprising a tubular container fabricated from a radiation shielding material, a series of spaced first openings formed in a wall portion of said container, said openings shielded from one another by the intervening wall portions of said container, a second opening formed in a wall portion of said container and removed from said first openings, a rotor mounted for rotation within said tubular container, a radiation detector mounted upon the outer periphery of said rotor, at least that portion of said rotor adjacent said detector being formed from a shielding material, means for rotating said rotor to juxtapose successively said radiation detector to said second opening and to each of said first openings, said detector being shielded from said second opening when juxtaposed to any one of said first openings by said rotor shielding material.

9. In a radiation monitoring system, the combination comprising radiation detection means, flow path means for potentially radioactive fluid material, said flow path means being formed to expose all of said potentially radioactive material to said detecting means at one position of said flow path means, said flow path means being formed at another position thereof to provide a plurality of spaced flow streams for said fluid material, said spaced flow streams being disposed to face a predetermined region, shielding means disposed within said region such that each of said flow streams faces said shielding means, at least a portion of said shielding means being rotatable within said region, and said shielding means being formed to permit exposure of said flow streams to said detecting means only one at a time.

10. In a radiation monitoring system, the combination comprising radiation detection means, flow path means for potential radioactive fluid material, said flow path means being formed to expose all of said potentially radioactive material to said detecting means at one position of said flow path means, said flow path means being formed at another position thereof to provide a plurality of spaced flow streams for said fluid material, said spaced flow streams being disposed in a generally circular array, shielding means, each of said flow streams being disposed at a position juxtaposed to said shielding means, and said shielding means being disposed adjacent said flow streams and formed to permit exposure of said flow streams to said detection means only one at a time, means for rotating at least a portion of said shielding means to expose said detection means to each of said spaced flow streams.

References Cited in the file of this patent

UNITED STATES PATENTS

| | | |
|---|---|---|
| 2,499,889 | Teichmann | Mar. 7, 1950 |
| 2,640,936 | Pajes | June 2, 1953 |
| 2,809,306 | Coleman | Oct. 8, 1957 |
| 2,823,179 | Snell et al. | Feb. 11, 1958 |
| 2,824,252 | Redman et al. | Feb. 18, 1958 |
| 2,874,108 | Ohlinger et al. | Feb. 17, 1959 |
| 2,896,084 | MacDonald | July 21, 1959 |
| 2,971,089 | Haywood | Feb. 7, 1961 |
| 2,979,451 | Pettinger | Apr. 11, 1961 |
| 2,987,459 | Labeyrie et al. | June 6, 1961 |